United States Patent Office 2,908,586
Patented Oct. 13, 1959

2,908,586

BEADED CARBON BLACK

Harold A. Braendle, Garden City, N.Y., and George L. Heller, Monroe, La., assignors to Columbian Carbon Company, New York, N.Y., a corporation of Delaware No Drawing. Application February 6, 1957
Serial No. 638,433

4 Claims. (Cl. 106—307)

This invention relates to improved pelleted or beaded carbon blacks, said beads having increased resistance to crushing and packing and to loss of their free-flowing and dustless characteristics during shipment, yet being readily dispersible in rubber compositions and the like. The invention provides an improved beaded carbon black and also a method of producing the beads.

It is a well-known practice to convert carbon black, which is normally a very fine flocculent powder, into generally spheroidal particles, known as beads, in order to reduce the difficulty and cost of handling, shipping and storing.

Such beads have been produced by a process involving the tumbling, or otherwise agitating the black, as by causing the dry black to pass slowly through a rotating drum, as described, for instance, in the Glaxner Patent No. 2,187,601. This procedure is herein referred to as "dry-beading."

Carbon black beads have also been produced by agitating the black with about an equal weight of water to form a somewhat pasty mass and continuing the agitation until the wet black has been formed into generally spheroidal beads as described, for instance, in Patent No. 2,065,371, the resultant wet beads then being dried to a moisture content not exceeding about 1%, and usually about 0.1% by weight. This latter method is herein referred to as "wet-beading."

Substantially dustless, free-flowing carbon black beads have been produced by each of these two well-known methods, i.e. the dry-beading process and the wet-beading process. The dry-beading process has the advantage of producing more nearly spheroidal beads and also of avoiding the necessity of subsequently drying the beads. But dry beads produced by either of these processes, especially those produced from certain types of carbon black, and more particularly carbon blacks known as "structure" blacks, frequently tend to crush, pack and mat together under severe conditions of shipment and mechanical handling and thus lose their free-flowing characteristics.

Various procedures have been proposed for increasing the crushing strength and, so-called, packing point of carbon black beads. It has also been proposed, for instance, in the beading of black by the wet-beading method, to include in the beading water a minor proportion of a binder, such as sugar or molasses. Such binders are uniformly dispersed through the beads. Numerous materials are available for use as binders for aggregates of solid particles, which are not suitable for use in the beading of carbon black to be used in the compounding of rubber, because of their adverse effect upon the ultimate dispersion of the carbon black in rubber mixes or the like, or upon the characteristics of the resultant rubber composition.

More recently, there has been proposed by one of us, a method of increasing the resistance of carbon black beads to crushing and packing by partially wetting preformed dry-process beads and thereafter drying the beads to a moisture content not in excess of 1%, by weight, by tumbling at an elevated temperature, as more fully described and claimed in application Ser. No. 630,225, filed December 24, 1956.

In accordance with the process of said application, the carbon black is first formed, by the dry-beading method, into beads having a bulk density of at least 20.5 pounds per cubic foot. The outer surfaces of these beads are thereafter uniformly wetted with water, in an amount within the range from 40 pounds to 90 pounds of water per 100 pounds of black, and then dried to a moisture content not exceeding 1% by weight. This procedure results in a strengthening of the outer surfaces of the beads and has been referred to as "case hardening." This partial wetting of the preformed beads is accomplished by spraying a carefully regulated quantity of water, sufficient to wet only the outer portion of the beads to a depth not exceeding about ¼ to ⅓ their diameter, while tumbling the beads, preferably at a somewhat elevated temperature. The drying of the beads is effected by continued tumbling at an elevated temperature in excess of 212° F.

The present invention constitutes an improvement over the process of said application whereby the resistance of the resultant beads to packing and crushing is still further increased without detrimentally affecting the dispersibility of the carbon black in rubber compositions or the like.

In accordance with the present invention, we deposit in the carbon black constituting the outer surface of the beads, a thermoplastic resin having a softening point such that at temperatures normally encountered in the storage, shipment and handling of carbon black beads, i.e. at room temperature, the resin is substantially solid but which, under temperatures encountered in the ultimate dispersion of the carbon black in rubber compositions or the like, is relatively soft. For this purpose, we have used rosin with particular advantage. Other resins having the physical properties of ordinary rosin are also useful for this purpose.

In accordance with our present process, the resin is applied to preformed dry-process beads by mixing an aqueous emulsion thereof with the water used in the case-hardening process just described. The resin of the emulsion should be of a particle size not exceeding about 5 microns and the emulsifying agent, used in forming the suspension of the solid resin particles, should be one which is decomposed at the temperature to be employed in the subsequent drying of the beads, so that the resin is thereby precipitated onto the carbon black beads without leaving any objectionable residue, e.g. soap or metallic deposit. Such emulsions in which the emulsifying agent is an ammonium rosin soap, have been used with particular advantage, especially in emulsions of colloidal rosin. At temperatures above 250° F., such as ordinarily used in the drying of the beads, the ammonium rosin soaps are decomposed leaving only a residue of rosin on the carbon black.

We have used with particular advantage, in accordance with the present invention, aqueous emulsions of rosin, containing ammonium rosin soap as the emulsifying agent, and containing 40% to 45% of rosin, by weight, ranging in particle size from less than 1 micron to a maximum of 3 microns, 90% of the solid particles being less than 1 micron in size and the emulsion having an alkaline pH ranging from 8 to 10.5. The particular emulsions so used were those marketed under the trade name "Dresinol."

It has previously been proposed uniformly to incorporate a water-soluble soap in pelleted carbon black to promote dispersion of the black in rubber compounds.

The present invention is distinguished therefrom in that the resultant beads are free from soap. Further, applicants' binder is not dispersed uniformly throughout the bead but appears to be deposited only on or near the surfaces of the beads. We believe that this fact accounts, in part at least, for the ready dispersion of the carbon black in spite of the extraordinarily high crushing strength of the beads. This also permits the use of smaller proportions of the binder.

It appears, as just indicated, that on wetting the carbon black beads with the water to which the resin emulsion had been added, the water penetrates the beads to a considerable depth but the resin is deposited in the carbon black constituting the outer shell of the beads and appears not to penetrate into the bead. The resultant beads have a surface appearance different from beads similarly wetted with water alone. A further change occurs when the beads are dried at a temperature in excess of the softening point of the resin, for instance, where rosin is used and the drying temperatures are in excess of 350° F. It appears that, under such conditions, the rosin melts and fuses together the carbon particles constituting the outer surfaces of the beads. However, this fusion and binding together of the carbon particles does not perceptibly interfere with the subsequent dispersion of the carbon black at temperatures encountered in the Banbury mixer conventionally used in the compounding of rubber.

It will be understood that rosin, or other resins of the type described, having different degrees of hardness, may be used in accordance with this invention, and that the proportions of resin emulsion used may be varied over a considerable range depending primarily upon the proportion of the resin present therein, the softening temperature of the resin and the desired properties of the resultant beads.

The proportion of water used in this case-hardening procedure will also vary somewhat, depending upon the characteristics of the particular black being beaded, but generally will be within the range of 40 pounds to 90 pounds per 100 pounds of dry carbon black. The proportion of resin emulsion mixed with the water may likewise be varied, as indicated above, depending upon the characteristics of the carbon black and the desired characteristics of the finished beads. Using an emulsion of the type previously described containing 40% to 45% solid rosin, advantageous results have been obtained using proportions of the emulsion as low as 0.5% and ranging to about 2% by weight of dry carbon black.

Where the beads are case-hardened in accordance with the present invention, it is not essential that the preformed, dry-process beads so treated be of the density required where the resin emulsion is not included in the water. In other respects, except for the inclusion of the resin emulsion in the case-hardening water, the process is the same as that described in the aforesaid pending application and may be carried out in apparatus such as therein disclosed.

Our invention will be illustrated and the beneficial effects thereof demonstrated by the following specific examples:

Examples

In this operation, the carbon black used was one of the HAF type, marketed under its trade name Statex R. In each run, identically prepared preformed dry-process beads were partially wetted with water and thereafter dried as previously described herein. In each run, the proportion of water was about 60% on the weight of the dry black. For comparative purposes, no additive was included in the water used in the first run. In the remaining runs, progressively increasing amounts of the resin emulsion were included in the water, ranging from 0.25% to 0.75% based on the dry weight of the carbon black. Maximum drying temperatures and the character-istics of the resultant beads are set forth in the following tabulation:

| Run | 1 | 2 | 3 | 4 | 5 |
|---|---|---|---|---|---|
| Additive, Percent | None | 0.25 | 0.50 | 0.50 | 0.75 |
| Maximum Drying Temperature, °F. | 350 | 350 | 350 | 400 | 350 |
| Tinting Strength | 107 | 105 | 105 | 105 | 104 |
| Oil Absorption, Gals. per 100 lbs. | 15.0 | 14.9 | 15.0 | 15.1 | 14.9 |
| Density, Pounds per Cubic Foot | 21.5 | 23.1 | 23.5 | 23.0 | 23.5 |
| Crushing Strength | 3.1 | 5.4 | 5.7 | 6.6 | 5.1 |
| Packing Point | 18.1 | 35.0 | 47.5 | 50.0 | 52.5 |

The tinting strength figures given above are reported as percentages of the corresponding value of a standard SAF black. From the foregoing tabulation, it appears that the crushing strength and packing point values of these beads were very substantially increased by the inclusion of the resin emulsion, without material change in the tinting strength, oil absorption or density of the beads.

The particular resin emulsion used in the foregoing examples was that marketed under the trade name "Dresinol 205" and contained about 45% of suspended, very pale rosin of moderately high softening point. We have also used with advantage a similar product marketed under the trade name "Dresinol 155" containing about 40% of a very pale rosin of extremely high softening point, "Dresinol 40" also containing about 40% of a pale extremely high softening point rosin, "Dresinol 42" containing about 40% of a pale, relatively low softening point rosin and "Dresinol 210-B" also containing about 40% of a very pale relatively low softening point rosin. In each instance, the emulsifying agent was the ammonium soap of the particular rosin.

The effect of the softening point and other characteristics of the resin emulsion used, on the crushing strength and packing point of the beads is illustrated by the following additional examples. In each of these examples, the carbon black used was of the HAF type. Preformed dry-process beads were, in each case, produced by the procedure of the preceding examples, the amount of water used in the case-hardening operation being 60 pounds per 100 pounds of black. The proportions and type of resin emulsion mixed with the case-hardening water and the resultant densities, packing points and crushing strength characteristics are set forth in the following tabulation.

The preformed dry-process beads, in each of the following and the preceding examples, were of a density of 21.9 pounds per cubic foot and had a packing point of 12.5 pounds and a crushing strength of 1.7 grams. These beads, treated identically with those of the following examples, except that no resin emulsion was included in the water, had a density of 22.2, a packing point of 32.5 and a crushing strength of 4.8. The beads were dried at a maximum temperature of 350°–400° F.

| | Density | Packing Point | Crushing Strength |
|---|---|---|---|
| "Dresinol 205": | | | |
| 0.5% | 22.4 | 32.5 | 6.0 |
| 1.0% | 22.5 | 42.5 | 7.5 |
| 2.0% | 22.4 | 45.0 | 9.6 |
| "Dresinol 210-B": | | | |
| 1.0% | 22.6 | 37.5 | 4.8 |
| 2.0% | 22.7 | 40.0 | 4.6 |
| "Dresinol 42": | | | |
| 0.5% | 23.5 | 37.5 | 3.9 |
| 1.0% | 23.5 | 40.0 | 7.3 |
| 2.0% | 23.7 | 47.5 | 7.2 |
| "Dresinol 40": | | | |
| 1.0% | 22.8 | 35.0 | 3.4 |
| 2.0% | 23.6 | 42.5 | 6.7 |
| "Dresinol 155": | | | |
| 1.0% | 23.3 | 37.5 | 3.6 |
| 2.0% | 23.1 | 35.0 | 3.5 |

From the foregoing, it appears that 2% of any of these resin emulsions is effective to increase either crushing strength or packing point or both packing point and crushing strength of HAF beads. However, the minimum effective proportion varies for different types of rosin contained, different types of carbon black, proportion of water used and drying temperature.

The relative effectiveness of equal proportions of identical resin emulsions on different types of carbon black and equal proportions of different resin emulsions on the same type of carbon black is illustrated by the following tabulation. In each run, the amount of water used was 60 pounds per 100 pounds of dry black and the proportion of resin emulsion was 1% on the dry weight of the black. The maximum drying temperature was, in each case, 350°–400° F. For comparison, we have also included the results of identical runs in which no resin was used.

| Type of Black | Type of Resin Emulsion | Density | Packing Point | Crushing Strength |
|---|---|---|---|---|
| FEF | #205 | 23.1 | 42.5 | 6.3 |
| FEF | None | 22.8 | 27.5 | 4.5 |
| ISAF | #205 | 21.1 | 42.5 | 5.5 |
| ISAF | None | 20.1 | 27.0 | 3.0 |
| SAF | #205 | 18.0 | 22.5 | 2.5 |
| SAF | None | 18.7 | 17.5 | 1.7 |
| FEF | #42 | 23.8 | 37.5 | 6.6 |
| FEF | None | 22.8 | 27.5 | 4.5 |
| ISAF | #42 | 19.0 | 25.0 | 2.6 |
| ISAF | None | 18.7 | 17.5 | 1.7 |
| SAF | #42 | 21.1 | 42.5 | 4.8 |
| SAF | None | 20.1 | 27.0 | 3.0 |

The herein referred to crushing strength of the beads is determined by carefully selecting from a mass of beads to be tested a single bead screened selectively to 0.6 mm. in diameter and placing the selected bead on a glass slide resting on one pan of an analytical balance. A second glass slide is rigidly supported in a fixed position just above the upper surface of the bead. After careful adjustment for tare, the other pan of the balance is gradually weighted until the bead between the glass slides is seen to crush or crack open. The crushing strength is then reported in grams.

The characteristic herein referred to as "packing point" is determined by placing a metal disk in the lower end of a 2-inch pipe 4¼ inches long held in a vertical position. The pipe is then almost filled with the carbon black beads to be tested and a similar disk is carefully placed on the surface of the pellets in the upper end of the tube. A constant weight is then applied to the upper disk for a period of 2–4 seconds. Thereafter, the weight is removed. If the beads flow freely from the pipe upon removal of the lower disk, the operation is repeated using an increased weight. If, at the increased weight, the beads bridge over and do not flow freely through the pipe upon removal of the weight and of the lower disk, the test is repeated with a somewhat decreased weight. The weight in pounds being applied to the upper disk when the beads just begin to bridge over within the pipe is recorded as the "packing point."

Carbon black beads produced in accordance with this invention have, with advantage, been compounded with low temperature polymer rubber compositions and also rubber compositions in which the rubber constituent is pale crepe. No difficulty was experienced in dispersing the carbon black in these rubber compounds.

We claim:
1. A beaded carbon black composed of substantially dry carbon black beads, the outer surfaces of which are composed of carbon black particles bound together by rosin, the interior of the beads being substantially free of rosin.

2. A beaded carbon black consisting essentially of carbon black beads having an outer coating of carbon black particles bound together by fused rosin, the interior of the beads being substantially free of rosin.

3. In the process of beading carbon black in which preformed dry-process beads are partially wetted with water and the beads thereafter dried, the steps of mixing with the water, prior to wetting the beads therewith, a minor proportion of an aqueous emulsion of rosin in which the emulsifying agent is ammonium rosin soap and decomposing the soap and thereby precipitating the rosin on the carbon black by drying the beads at a temperature in excess of 250° F.

4. The process of claim 3 in which an ammonium soap, aqueous emulsion of rosin, containing 40% to 45% solid rosin, is mixed with the water in proportions within the range from 0.5% to about 2% on the dry weight of the black.

References Cited in the file of this patent

UNITED STATES PATENTS

| 1,651,733 | Sheppard et al. | Dec. 6, 1927 |
| 2,040,818 | Badollet | May 19, 1936 |
| 2,538,482 | Studebaker | Jan. 16, 1951 |
| 2,758,039 | Barbour | Aug. 7, 1956 |